3,773,739
BASIC POLYAMIDES AND PROCESS FOR
THEIR PREPARATION
Alberto Bonvicini, Terni, and Giuseppe Cantatore,
Collescipoli, Italy, assignors to Montecatini Edison
S.p.A., Milan, Italy
No Drawing. Original application Sept. 29, 1970, Ser. No.
76,646, now Patent No. 3,668,278. Divided and this
application Apr. 28, 1972, Ser. No. 248,630
Claims priority, application Italy, Oct. 1, 1969,
22,766/69; Oct. 2, 1969, 22,830/69
Int. Cl. C08g 20/20
U.S. Cl. 260—78 A          6 Claims

ABSTRACT OF THE DISCLOSURE

A new class of basic polyamides having a molecular weight between about 2000 and 200,000. The polyamides are prepared by first reacting an acrylic or methacrylic ester with a monoamine and then further reacting the obtained product with a polyamine. The polyamides are suitable for use as tinctorial modifiers for polymeric materials and particularly for crystalline polyolefins consisting essentially of isotactic macromolecules.

CROSS-REFERENCES TO RELATED APPLICATION

This application is a division of our copending application Ser. No. 76,646, filed Sept. 29, 1970, now U.S. Pat. No. 3,668,278, the contents of which are hereby incorporated herein by reference.

BACKGROUND OF THE INVENTION (1) Field of the invention

This invention relates to basic polyamides. More particularly, this invention concerns basic polyamides that are condensation products of acrylic or methacrylic esters with both a monoamine and a polyamine.

(2) Description of the prior art

Basic polyamides obtained by the polycondensation of isocinchomeronic acid with diamines are described in U.S. Pat. No. 3,320,334. The polycondensation of an N,N'-bis (ω-carboalkoxyalkyl)piperazine with a diamine is described in U.S. Pat. No. 3,331,888. In addition, the reaction of an acrylic or methacrylic ester with one or more polyamines is well known.

Also, in a series of articles in "Chimica e Industria" (March 1967, page 271; May 1967, page 453; June 1967, page 587; August 1967, page 826), a number of basic polyamides obtained by polycondensation of various diacrylyl derivatives with different amines are described.

U.S. Pat. 3,445,441 discloses a group of amino-amido polymers which are the reaction products of a polyamine and an acrylic type compound. Such polymers are used to break oil-in-water emulsions, inhibit corrosion and clarify water. Also discloses polyamides which can be formed into fibers but are particularly suitable as curable wet strength adhesives, which polyamide resins are prepared by reacting an acrylic ester and an amine in a polar medium at a temperature of 30° C. or below. An earlier Canadian patent, No. 435,450, discloses the production of polyamides by the reaction of diamines with dicarboxylic acids or amide forming derivatives thereof having a tertiary amino nitrogen. Alternatively, tertiary nitrogen-containing amino acids of the formula

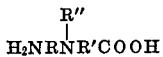

can be employed.

SUMMARY OF THE INVENTION

We have discovered a new class of basic polyamides and an economical process for the preparation thereof. The polyamides of the present invention are suitable for use as tinctorial modifiers for polymers, particularly olefinic polymers; they render such polymers particularly receptive to dyes of the acid, metallized and plastosoluble classes. Additionally, we have found that the basic polyamides of the present invention, when incorporated into crystalline polyolefins consisting essentially of isotactic macromolecules, substantially improve workability of such mixes in the granulating, extrusion, stretching and textile finishing operations.

As described more fully in our application Ser. No. 76,646, now U.S. Pat. No. 3,668,278 the polyamides of the present invention are also suitable tinctorial modifiers for fibrogenous polymers other than olefin polymers, such as, for example, acrylic polymers, e.g., polyacrylonitrile, vinyl polymers, e.g., polyvinyl chloride, polyesters, polyamides and the like.

The polyamides of the present invention may be prepared by reacting a monoamine with an ester of acrylic or methacrylic acid and further reacting the product thereby obtained with a polyamine. Preferably, the polyamides of the present invention have molecular weights in the range of from about 2000 to 200,000.

The basic polyamides of the present invention have the formula:

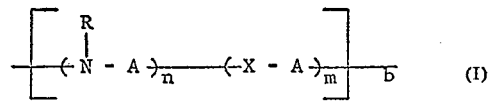

wherein $n$ and $m$ are integers from 1 to 99; $b$ is an integer; N is nitrogen; R is an aliphatic radical, cycloaliphatic radical or aromatic radical selected from the group consisting of radicals of the phenyl and naphthyl series, which radicals contain up to 30 carbon atoms; A is

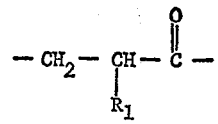

wherein $R_1$ is hydrogen or a lower alkyl radical; X is

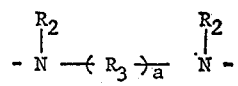

wherein $R_2$ is hydrogen or a lower alkyl radical, $R_3$ is a methylene radical, an arylene radical selected from the group consisting of radicals of the phenylene series, or lower alkylenearylene radical wherein the arylene portion is selected from the group consisting of radicals of the phenylene series, and $a$ is an integer from 1 to 10; with the proviso that when $a$ is 1, $R_3$ may also be

wherein each of the two $R_4$ groups may be the same or different and each $R_4$ is lower alkylene radical or

wherein each $R_5$ is —$CH_2$— or —$C_2H_4$— and $z$ is an integer from 1 to 5; or $R_3$ may be a heterocyclic bivalent residue which may contain heteroatoms selected from the group consisting of nitrogen in the form of secondary or tertiary amine groups, oxygen, sulfur and phosphorus; or X is

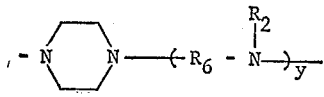

wherein $R_2$ is as defined above; $R_6$ is —CH$_2$— or

—C$_2$H$_4$— and $y$ is 0 or 1, the molecular weight of the polyamide being between about 2,000 and 200,000.

While, as would be appreciated in this art, many different terminal groups could be introduced onto the polyamides of the present invention without basically affecting the nature thereof or departing from this invention, and while it is the usual practice in the art to omit terminal groups from a description of long chain polymers, particularly since such groups are generally not detectable by routine analysis, nevertheless, for completeness, it will be understood that, as produced at the end of the condensation reaction, the polyamides can generally be represented as being terminated by terminals $R_7$, equal or different between them, as in the following formula:

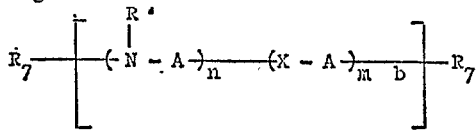

wherein: $n$, $m$, $b$, N, R, A and X are as defined above and $R_7$ is —NHR$_8$; wherein $R_8$ is hydrogen, an alkyl radical, an aryl radical selected from the group consisting of radicals of the phenyl and naphthyl series, or cycloalkyl radical, which radicals contain up to 30 C or $R_8$ and the nitrogen to which it is bonded, taken together, form a heterocyclic ring, or $R_7$ is —COOR$_9$ wherein $R_9$ is a lower alkyl radical containing 1 to 8 carbon atoms.

DESCRIPTION OF THE PREFERRED EMBODIMENTS

Preferably, that portion of Formula I designated:

is a residue of a monoamine selected from the group consisting of methylamine, ethylamine, propylamine, butylamine, hexylamine, octylamine, dodecylamine, octadecylamine, cyclohexylamine, aniline and p-toluidine.

Preferably, that portion of Formula I designated:

—A— is a residue of methylacrylate, ethylacrylate, methylmethacrylate, butylacrylate, butylmethacrylate, or 2-ethylhexylacrylate.

Preferably, that portion of Formula I designated:

—X— is a residue of a polyamine having the formula:

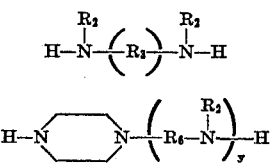

wherein $R_2$, $R_3$, $R_6$, $a$ and $y$ are as defined above.

Most preferably, that portion of Formula I designated:

—X— is a residue of a polyamine selected from the group consisting of ethylenediamine, hexamethylenediamine, diethylenetriamine, tetraethylenepentamine, piperazine, N-(2-aminoethyl)piperazine, p-phenylenediamine, 4,4'-methyl-enedianiline, N,N' - dimethylhexamethylenediamine and N,N'-dibutylhexamethylenediamine.

The polyamides of the present invention may be easily and inexpensively obtained by reacting an acrylic or methacrylic ester with aliphatic, cycloaliphatic or aromatic monoamines containing up to 30 carbons, for example, methylamine, ethylamine, propylamine, butylamine, hexylamine, octylamine, dodecylamine, octadecylamine, cyclohexylamine, aniline and p-toluidine, and then reacting the product of that reaction with one or more polyamines.

Preferable acrylic esters are those having a small number of carbon atoms, for example, methylacrylate, ethylacrylate, and methylmethacrylate. However, acrylic esters with a greater number of carbon atoms, for example, butylacrylate, butylmethacrylate, 2-ethylhexylacrylate, and other like acrylic esters, may be used.

Preferably, the polyamine has the formula:

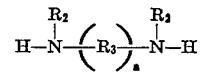

or

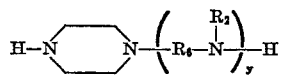

wherein $R_2$, $R_3$, $R_6$, $a$, and $y$ are as defined above.

Most preferably, the polyamine is selected from the group consisting of ethylenediamine, hexamethylenediamine, diethylenetriamine, tetraethylenepentamine, piperazine, N-(2-aminoethyl)piperazine, p-phenylenediamine, 4,4'-methylenedianiline, N,N' - dimethylhexamethylenediamine and N,N'-dibutylhexamethylenediamine.

The basic polyamides may be prepared in the presence or absence of solvents (such as for instance aliphatic and cycloaliphatic alcohols) and/or condensing agents, (such as alkaline methoxides), by first reacting the acrylic or methacrylic ester with the aliphatic or aromatic monoamine containing up to 30 carbon atoms. The reaction product is then reacted with the polyamine by simply adding the polyamine to the reaction mixture. The acrylic ester necessary for the reaction can be all added during the first step (reaction with the monoamine) or a portion of it can be added during the first step and another portion during the second step (reaction with the polyamine). Both of the reactions, i.e., that of the acrylate with the monoamine and that of the product thereof with the polyamine, may be carried out at temperatures ranging from room temperature to about 120° C.

The polycondensation is completed by heating at temperatures in the range between about 120° C. and 300° C. Also, a vacuum may be used in order to remove from the reaction system the alcohol that is released by the polycondensation.

The molar ratio between the acrylic ester or the methacrylic ester and the total amines is preferably 1:1. However, an excess of one or the other of the reactants may also be used. Preferably an excess of the total amines, up to 30%, is used.

The aliphatic, cycloaliphatic or aromatic monoamine containing up to 30 carbon atoms and the polyamine (or the mixture of several amines) may be present in the reaction mixture in a wide ratio to each other. With respect to the total amines, each amine, i.e., the monoamine and the polyamine, may, in fact, vary from 1% to 99% by moles.

The following examples further illustrate our invention.

EXAMPLE 1

269 g. (1 mole) of octadecylamine and 172 g. (2 moles) of methylacrylate were heated with stirring, under a nitrogen atmosphere, at a temperature of 100° C. for 2 hours. To this mixture were then added 129 g. (1 mole) of N-(2-aminoethyl)piperazine and the whole was then further heated at 100° C. for 2 hours, at 120° C. for 2 hours, at 150° C. for 1 hour and at 180° C. for 1 hour, removing the methanol formed during the reaction. The reaction mixture was further treated for 1 hour at 180° C. under vacuum.

The product obtained was a solid, basic polyamide having a yellowish color, an inherent viscosity $[\eta]$ of 0.08 measured in a 0.5% isopropanol solution, a melting point of 120° C. and titratable nitrogen of 5.4% (calculated= 5.5%).

EXAMPLE 2

185 g. (1 mole) of dodecylamine and 172 g. (2 moles) of methylacrylate were heated with stirring, under a nitrogen atmosphere, at 100° C. for 2 hours. To this mixture were then added 129 g. (1 mole) of N-(2-aminoethyl)-piperazine. The whole mixture was further heated at 100° C. for 2 hours, at 120° C. for 2 hours, at 150° C. for 1 hour and at 180° C. for 1 hour, removing all the methanol formed during the reaction. The reaction mixture was further treated at 180° C. for 1 hour, under vacuum.

The basic polyamide thus obtained was a semi-solid product having a light yellow color, with a titratable nitrogen of 6.5% (calculated=6.6%).

EXAMPLE 3

269 g. (1 mole) of octadecylamine and 172 g. (2 moles) of methylacrylate were heated with stirring, in a nitrogen current, at 100° C. for 2 hours. To this mixture were then added 208 g. (1.1 mole) of tetraethylenepentamine, and the whole was heated at 100° C. for 2 hours, at 120° C. for 2 hours, at 150° C. for 1 hour and at 180° C. for 1 hour, removing the methanol that had formed during the reaction. The reaction mixture was further treated for 1 hour under vacuum at 180° C.

The basic polyamide thus obtained was a yellow solid having a titratable nitrogen of 10.0% (calculated= 10.0%).

EXAMPLE 4

80.7 g. (0.3 mole) of octadecylamine and 51.6 g. (0.6 mole) of methylacrylate were heated with stirring, in a nitrogen current, at 100° C. for 2 hours. To this mixture were then added 129 g. (1 mole) of N-(2-aminoethyl) piperazine and 60.2 g. (0.7 mole) of methylacrylate. The whole was then heated at 100° C. for 2 hours, at 120° C. for 2 hours, at 150° C. for 1 hour and at 180° C. for 1 hour, removing the methanol that had formed during the reaction. The reaction mixture was further treated for 1 hour at 180° C. under vacuum.

The basic polyamide thus obtained was a light yellow solid, having an inherent viscosity $[\eta]$ of 0.08 (measured in a 0.5% isopropanol solution) and a titratable nitrogen of 9.85% (calculated=10.0%).

EXAMPLE 5

55.5 g. (0.3 mole) of dodecylamine and 51.6 g. (0.6 moles) of methylacrylate were heated with stirring, in a nitrogen current, at 100° C. for 2 hours. To this mixture were then added 129 g. (1 mole) of N-(2-aminoethyl) piperazine and 60.2 g. (0.7 mole) of methylacrylate. The whole was then heated at 100° C. for 2 hours, at 120° C. for 2 hours, at 150° C. for 1 hour and at 180° C. for 1 hour, removing the methanol that had formed during the reaction. The reaction mixture was further treated for 1 hour at 180° C. under vacuum.

The basic polyamide thus obtained was a waxy solid product having a light yellow color, an inherent viscosity $[\eta]$ of 0.08 (measured in a 0.5% isopropanol solution) and a titratable nitrogen of 10.90% (calculated=11.0%).

EXAMPLE 6

80.7 g. (0.3 moles) of octadecylamine and 60 g. (0.6 moles) of methylmethacrylate were heated with stirring in a nitrogen current for 2 hours at 100° C. To this mixture were then added 129 g. (1 mole) of N-(2-aminoethyl)piperazine and 70 g. (0.7 moles) of methylmethacrylate. The whole was then heated for 2 hours at 100° C., for 2 hours at 120° C., for 1 hour at 150° C. and for 1 hour at 180° C., removing all the methanol that had formed during the reaction. The reaction mixture was further treated for 1 hour at 180° C. under vacuum.

The basic polyamide thus obtained was a light yellow solid having an inherent viscosity $[\eta]$ of 0.06 (measured in a 0.5% isopropanol solution) the titratable nitrogen being 9.35% (calculated=9.4%).

EXAMPLE 7

80.7 g. (0.3 moles) of octadecylamine and 51.6 g. (0.6 moles) of methylacrylate were heated with stirring in a nitrogen current for 2 hours at 100° C. To this mixture were then added 64.5 g. (0.5 moles) of N-(2-aminoethyl)piperazine, 94.5 g. (0.5 moles) of tetraethylenepentamine and 60.2 g. (0.7 moles) of methylacrylate, and the whole was then further heated for 2 hours at 100° C., for 2 hours at 120° C., for 1 hour at 150° C. and for 1 hour at 180° C., removing all the methanol that had formed during the reaction. The mixture was then treated for 1 hour at 180° C. under vacuum.

The basic polyamide thus obtained was a light yellow solid having an inherent viscosity $[\eta]$ of 0.10 (measured in a 0.5% isopropanol solution) and a titratable nitrogen of 12.2% (calculated=12.2%).

EXAMPLE 8

80.7 g. (0.3 moles) of octadecylamine and 51.6 g. (0.6 moles) of methylacrcylate were heated with stirring in a current of nitrogen for 2 hours at 100° C. To this mixture were then added 60 g. (1 mole) of ethylenediamine and 60.2 g. (0.7 moles) of methylacrylate, and the whole was then heated for 2 hours at 100° C., for 2 hours at 120° C., for 1 hour at 150° C. and for 1 hour at 180° C., removing the methanol that had formed during the reaction. The mixture was then further treated for 1 hour at 180° C. under vacuum.

The basic polyamide thus obtained was a light yellow solid having an inherent viscosity $[\eta]$ of 0.06 (measured in a 0.5% isopropanol solution), the titratable nitrogen being 8.4% (calculated=8.6%).

EXAMPLE 9

53.8 g. (0.2 moles) of octadecylamine and 34.4 g. (0.4 moles) of methylacrylate were heated with stirring in a current of nitrogen for 2 hours at 100° C. To this mixture were then added 129 g. (1 mole) of N-(2-aminoethyl)piperazine and 68.8 g. (0.8 moles) of methylacrylate, and the whole was then heated for 2 hours at 100° C., for 2 hours at 120° C., for 1 hour at 150° C. and for 1 hour at 180° C., removing the methanol that had formed during the reaction. The mixture was further treated for 1 hour at 180° C. under vacuum.

The basic polyamide thus obtained was a light yellow solid product having an inherent viscosity $[\eta]$ of 0.11 (measured in a 0.5% isopropanol solution), the titratable nitrogen being 11.2% (calculated=11.3%).

EXAMPLE 10

While the use of the polyamides of the present invention as tinctorial modifiers is more fully illustrated in application Ser. No. 76,646, now U.S. Pat. No. 3,668,278, this illustrative example is presented herein for the sake of convenience.

80 g. of a basic polyamide, obtained as described in Example 1, were mixed together with 920 g. of crystalline polypropylene consisting essentially of isotactic macromolecules (having a melt index of 22.5, an ash content of 0.009% and a residue after heptane extraction of 97.2%).

This mixture was then extruded at 220° C., and the granulate obtained was transformed into fibers under the following conditions:

Spinning:

| | | |
|---|---|---|
| Temperature of worm screw | ° C | 230 |
| Temperature of extruding head | ° C | 230 |
| Temperature of spinneret | ° C | 235 |
| Spinneret | | (1) |
| Maximum pressure | kg./sq. cm | 50 |
| Winding speed | m./min | 400 |

Stretching (drawing):

| | | |
|---|---|---|
| Temperature | ° C | 130 |
| Medium | | Steam |
| Stretching ratio | | 1:5 |

¹ 60 holes, each having a diameter of 0.8 mm. and a length of 16 mm.

The obtained fibers possessed a good affinity towards the following dyestuffs:

Red for Wool B (C.I. acid red 115) "acid"
Alizarine Blue SE (C.I. acid blue 43) "acid"
Lanasyn Red 2GL (C.I. acid red 216) "pre-metallized"
Lanasyn Brown 3RL (C.I. acid brown 30) "pre-metallized"

The dyed fibers possessed good light fastness and good fastness to washing and rubbing.

The dyeing operations were carried out for 1½ hours at the boiling point, in dyeing baths containing 2.5% of dye (acid, pre-metallized or plastosoluble) based on the weight of the fibers, with a fiber/bath ratio of 1:40.

The dyeings with acid and pre-metallized dyes were conducted in the presence of 1% by weight, based on the weight of the fiber, of a surfactant consisting of the condensation product of ethylene oxide with an alkylphenol or of the sodium salt of N-oleyl-N-methyltaurine. 30 minutes after the start of the boiling, 2%, based on the weight of the fiber, of a 20% solution of acetic acid was added in order to improve the exhaustion of the baths.

The dyeings with plastosoluble dyes were conducted in the presence of 2% of surfactant and 3% of ammonium acetate, based on the weight of the fiber.

After the dyeing, the yarns were rinsed with running water. The rinsed yarns appeared intensely dyed, both with the acid and the pre-metallized dyes as well as with the plastosoluble dyes.

Variations can, of course, be made without departing from the spirit and scope of the invention.

Having thus described the invention, what we desire to secure by Letters Patent and hereby claim is:

1. A basic polyamide, the repeating units of which may be the same or different, said polyamide having the formula:

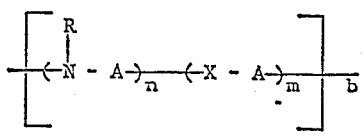

wherein:
$n$ and $m$ are integers from 1 to 99; $b$ is an integer;
N is nitrogen;
R is an aliphatic radical, cycloaliphatic radical or aromatic radical selected from the group consisting of radicals of the phenyl and naphthyl series, which radicals contain up to 30 carbon atoms;
A is

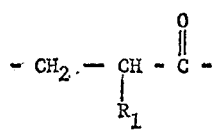

wherein $R_1$ is hydrogen or a lower alkyl radical;
X is

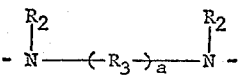

wherein $R_2$ is hydrogen or a lower alkyl radical, $R_3$ is a methylene radical, an arylene radical selected from the group consisting of radicals of the phenylene series, or a lower alkylenearylene radical wherein the arylene portion is selected from the group consisting of radicals of the phenylene series, and $a$ is an integer from 1 to 10; with the proviso that when $a$ is 1, $R_3$ may also be $$-R_4-NH-R_4-$$

wherein the two $R_4$'s may be the same or different and each $R_4$ is a lower alkylene radical or

wherein each $R_5$ is —$CH_2$— or —$C_2H_4$— and $z$ is an integer from 1 to 5;
or $R_3$ may be a heterocyclic bivalent residue which may contain heteroatoms selected from the group consisting of nitrogen in the form of secondary or tertiary amine groups, oxygen, sulfur and phosphorus; or
X is

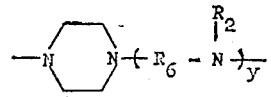

wherein $R_2$ is as defined hereinabove, $R_6$ is —$CH_2$— or —$C_2H_4$— and $y$ is 0 or 1, the molecular weight of the polyamide being between about 2,000 and 200,000.

2. The basic polyamide of claim 1 having the formula:

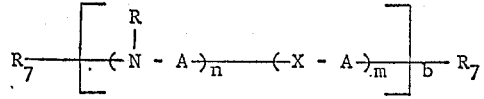

wherein:
$n$, $m$, $b$, N, R, A and X are as defined in claim 1,
$R_7$ is —$NHR_8$ wherein $R_8$ is hydrogen, an alkyl radical, an aryl radical selected from the group consisting of radicals of the phenyl and naphthyl series, or a lower cycloalkyl radical, or
$R_8$ and the nitrogen to which it is bonded taken together form a heterocyclic ring, or
$R_7$ is —$COOR_9$ wherein $R_9$ is a lower alkyl radical containing 1 to 8 carbon atoms.

3. The polyamide of claim 1 wherein:
(a)

is a residue of a monoamine selected from the group consisting of methylamine, ethylamine, propylamine, butylamine, hexylamine, octylamine, dodecylamine, octadecylamine, cyclohexylamine, aniline, and p-toluidine;
(b) —A— is a residue of methylacrylate, ethylacrylate, methylmethacrylate, butylacrylate, butylmethacrylate or 2-ethylhexylacrylate; and
(c) —X— is a residue of a polyamine selected from the group consisting of ethylenediamine, hexamethylenediamine, diethylenetriamine, tetraethylenepentamine, piperazine, N-(2-aminoethyl)piperazine, p-phenylenediamine, 4,4'-methylenedianiline, N,N'-dimethylhexamethylenediamine and N,N'-dibutylhexamethylenediamine.

4. A process for preparing the polyamide of claim 1 comprising:
(a) reacting an acrylic or methacrylic ester with an aliphatic, cycloaliphatic or aromatic monoamine having up to 30 carbon atoms, at a temperature between about room temperature and about 120° C.;

(b) reacting the product of step (a) with one or more polyamines, at a temperature between about room temperature and about 120° C., said polyamine having the formula:

H—X—H wherein X is as defined in claim 1; and (c) completing the reaction by maintaining the reaction mixture at a temperature from about 120 to about 300° C. while eliminating under vacuum the alcohol formed during step (b) and said completion step.

5. The process of claim 4, wherein steps (a), (b) and (c) are carried out in the presence of a solvent or condensing agent.

6. The process of claim 5, wherein the monoamine is selected from the group consisting of methylamine, ethylamine, propylamine, butylamine, hexylamine, octylamine, dodecylamine, octadecylamine, cyclohexylamine, aniline and p-toluidine;

the acrylic or methacrylic ester is selected from the group consisting of methylacrylate, ethylacrylate, butylacrylate, 2-ethylhexylacrylate, methylmethacrylate, and butylmethacrylate; and the polyamine is selected from the group consisting of ethylenediamine, hexamethylenediamine, diethylenetriamine, tetraethylenepentamine, piperazine, N-(2-aminoethyl)piperazine, p-phenylenediamine, 4,4'-methylenedianiline, N,N'-dimethylhexamethylenediamine, and N,N'-dibutylhexamethylenediamine.

References Cited
UNITED STATES PATENTS

| | | | |
|---|---|---|---|
| 3,304,289 | 2/1967 | Ballentine et al. | 260—78 A |
| 3,379,696 | 4/1968 | Wiloth | 260—78 A |
| 3,632,558 | 1/1972 | Siclari et al. | 260—78 A |
| 3,644,572 | 2/1972 | Mayer et al. | 260—78 A |

HARRY WONG, Jr., Primary Examiner

U.S. Cl. X.R.

8—162; 260—857 L, 860, 898, 899; 264—210 F

UNITED STATES PATENT OFFICE
CERTIFICATE OF CORRECTION

Patent No. 3,773,739           Dated November 20, 1973

Inventor(s) Alberto Bonvicini et al

It is certified that error appears in the above-identified patent and that said Letters Patent are hereby corrected as shown below:

Column 1, line 10: "22,766/69; Oct. 2, 1969, 22,830/69" should read -- 22,766 A/69; Oct. 2, 1969, 22,830 A/69 --.

Column 1, line 56: "Also discloses" should read -- Also, Canadian Patent 779,398 discloses --.

Column 2, line 57: "or" should read -- or a --.

Column 2, line 65: "is" should read -- is a --.

Column 3, lines 64=67:

" 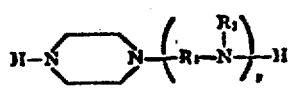 " should read -- 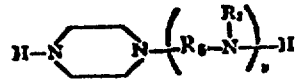 --.

Signed and sealed this 20th day of August 1974.

(SEAL)
Attest:

McCOY M. GIBSON, JR.
Attesting Officer

C. MARSHALL DANN
Commissioner of Patents